United States Patent [19]

Marvel

[11] 4,451,320
[45] May 29, 1984

[54] PACKET-TYPE LAMINATOR

[76] Inventor: Fred D. Marvel, 1417 E. 2nd St., Tulsa, Okla. 74120

[21] Appl. No.: 338,427

[22] Filed: Jan. 11, 1982

[51] Int. Cl.³ .............................................. B30B 15/34
[52] U.S. Cl. .................... 156/366; 100/93 P; 100/93 RP; 156/555; 156/583.1
[58] Field of Search ...................... 156/555, 582, 583.1, 156/583.5, 553, 64, 366; 100/93 RP, 93 P

[56] References Cited

U.S. PATENT DOCUMENTS

| | | | |
|---|---|---|---|
| 2,542,901 | 2/1951 | Chaffee | 156/583.5 |
| 3,340,130 | 9/1967 | Dunn et al. | 156/555 |
| 3,711,355 | 1/1973 | Staats et al. | 156/555 |
| 4,116,749 | 9/1978 | Dufort et al. | 156/555 |
| 4,172,750 | 10/1979 | Giulie | 156/366 |

Primary Examiner—Michael G. Wityshyn
Attorney, Agent, or Firm—Head, Johnson & Stevenson

[57] ABSTRACT

A packet-type laminating machine for laminating a flat object between two sheets of protective plastic film, involving two pairs of motor driven inlet and outlet rollers under compression with heating platens between and cooling shelf with guide after, wherein a gentle compression with minimum drag is applied at the heating and cooling stages and all components are adapted to be readily dropped into recesses in the top edges of support sidewalls during assembly of the laminator. Such a laminator is extremely efficient to operate and is readily assembled and repaired, leading to reduced operating, maintenance and capital investment costs.

6 Claims, 7 Drawing Figures

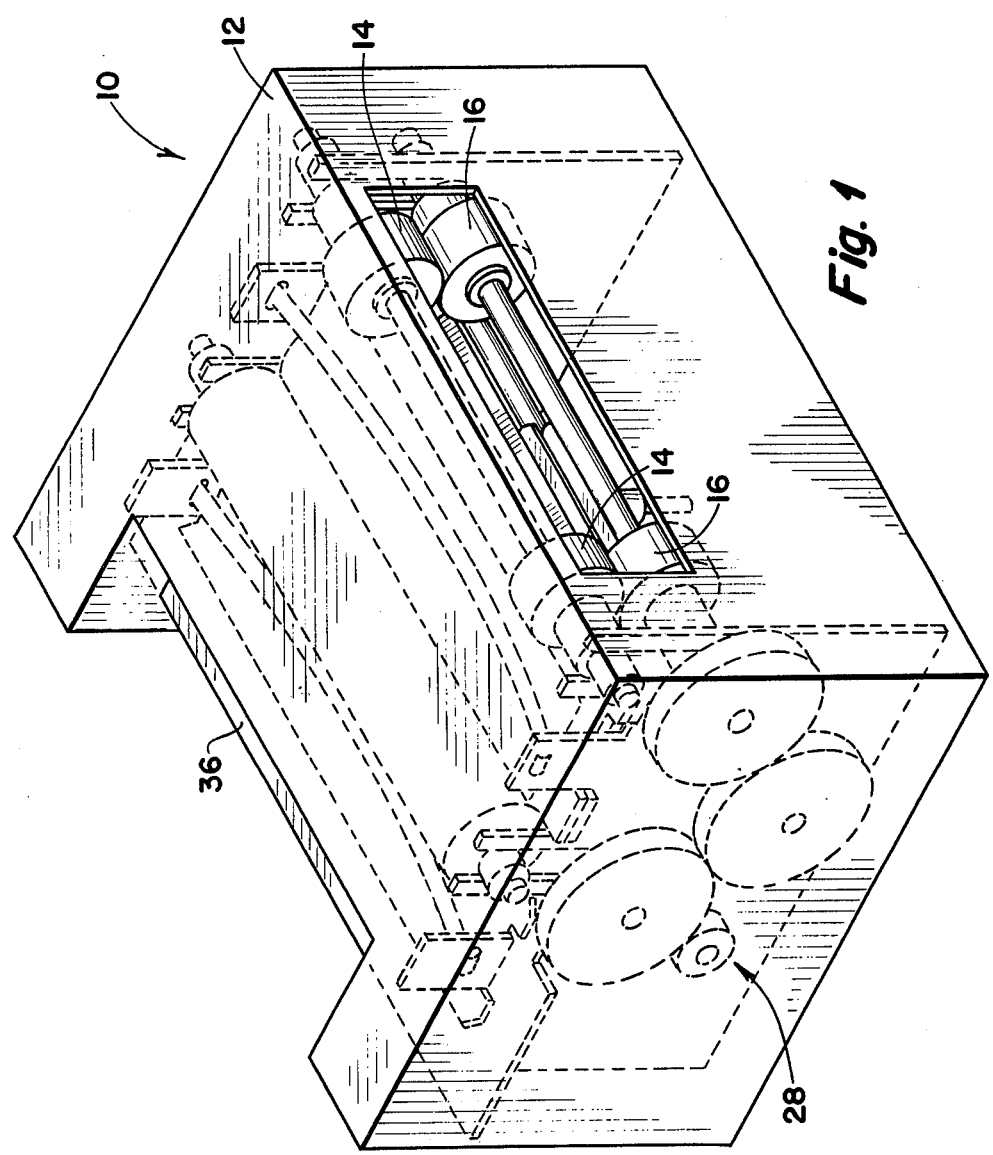

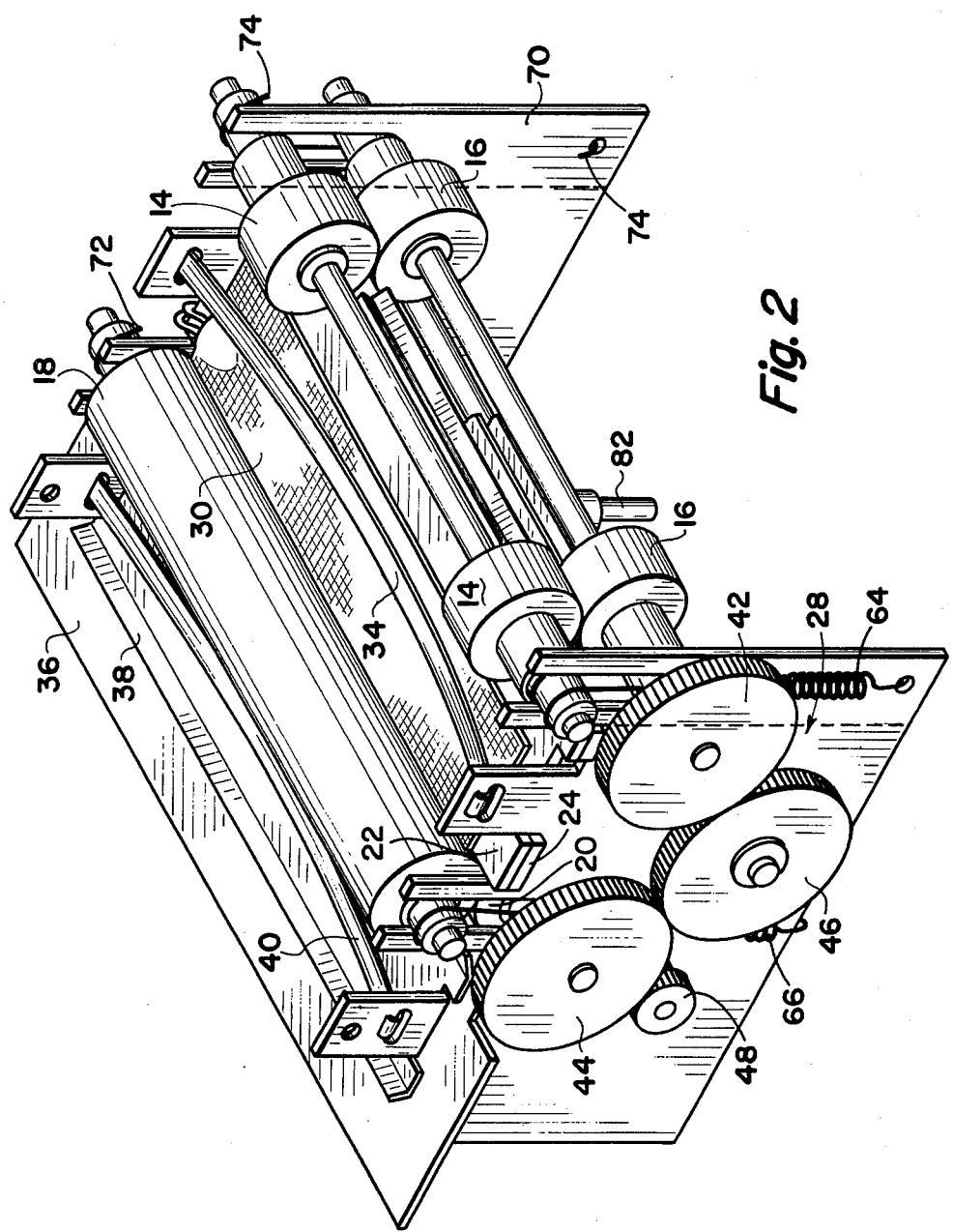

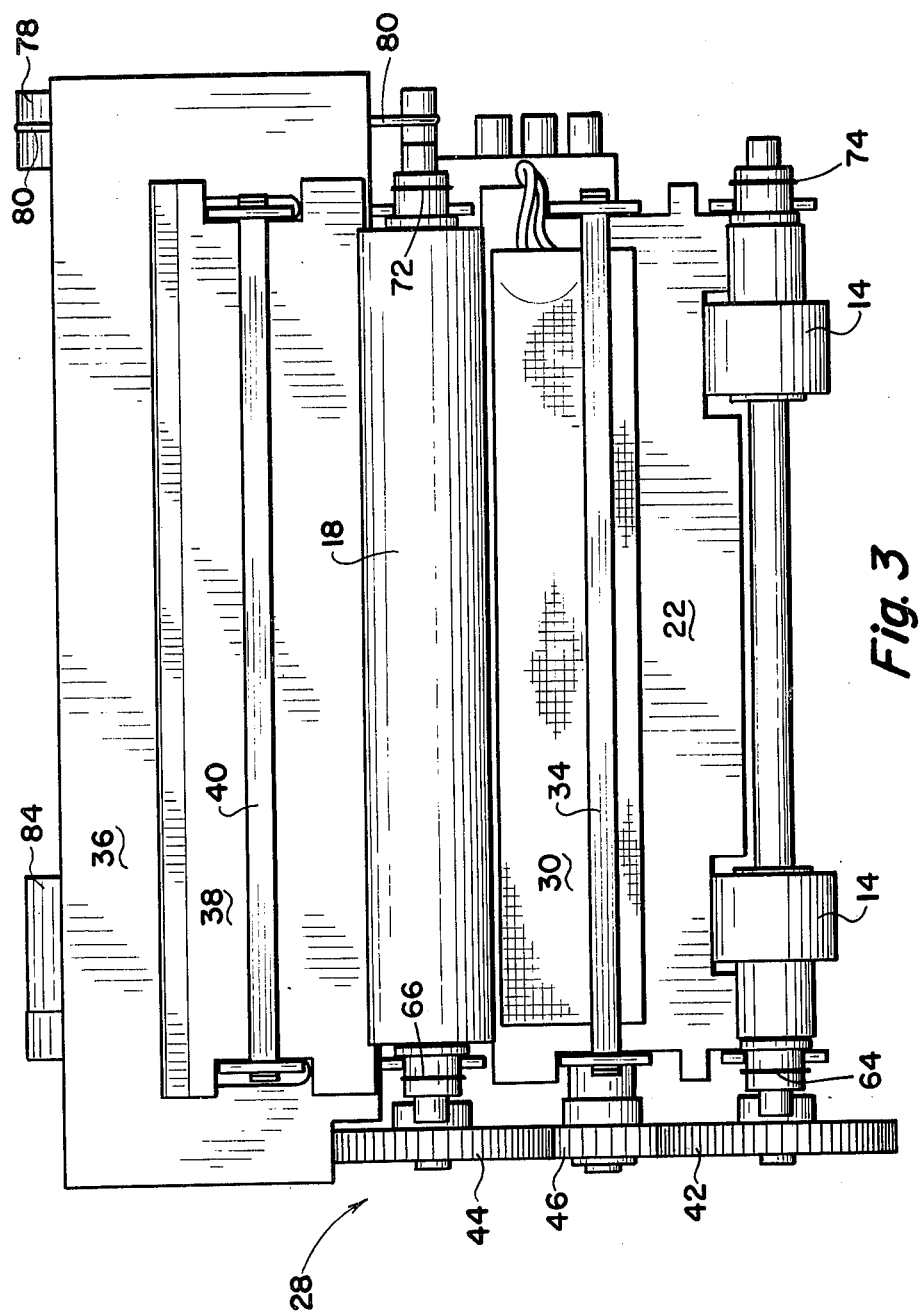

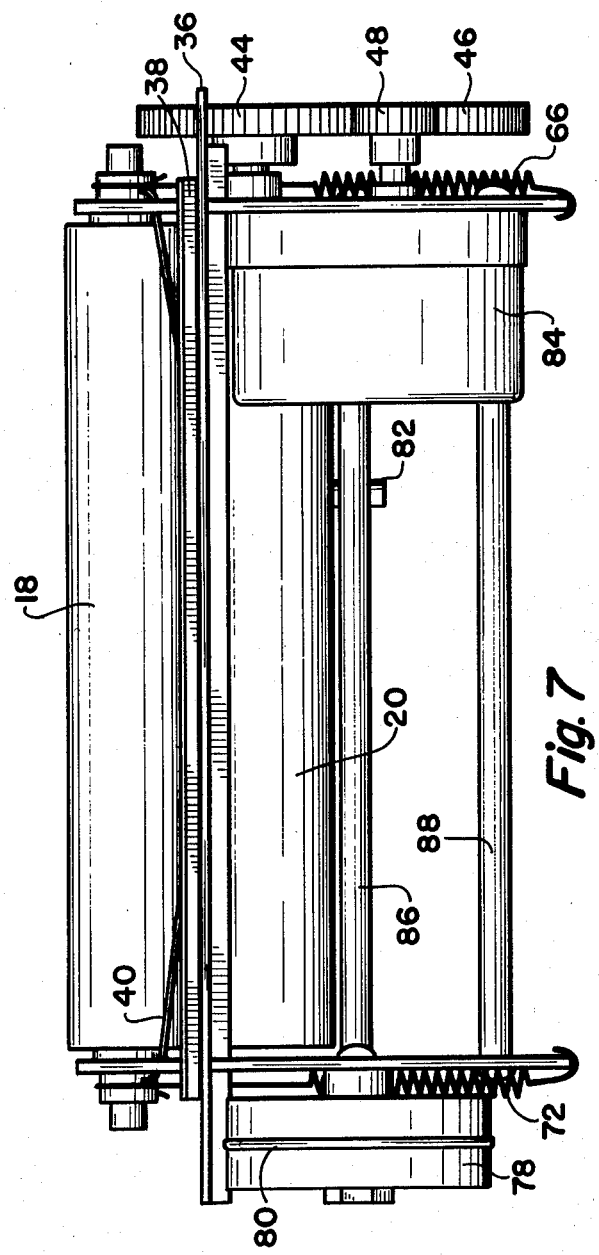

PACKET-TYPE LAMINATOR

BACKGROUND OF THE INVENTION

1. Field of the Invention

This invention relates to an improved laminator. More specifically, the invention relates to an inexpensive packet-type laminator employing contact heating platens, compression rollers and cooling surfaces that can be readily disassembled, repaired or replaced, and then easily reassembled.

2. Description of the Prior Art

With the advent of the packet-type laminable plastic pouch, the concept of sealing a driver's license, identification card, credit card, photograph or the like has become increasingly popular. Thus it is generally known to place such an object within a packet between layers of thermoplastic sheet and then pass the entire pouch and contents through a small portable heat sealing laminator. After exiting the laminator, the packet is cooled and the outer protective layers are removed to recover the thermoplastic encapsulated object.

Various alternative methods have been proposed to improve laminators with varying degrees of commercial success. For example, in U.S. Pat. No. 3,771,355 a compact laminator involving an oven with spaced heating platens which do not make contact with the packet is disclosed. In contrast, U.S. Pat. No. 3,770,550 discloses a laminator that employs heating platens that not only make contact with the packet but are also biased under pressure to squeeze the forward portion of the platens together as the packet passes through the laminator.

However, in the first case with no direct thermal contact between the heating element and the packet, heat transfer properties and thermal efficiency are not optimized, requiring unnecessary energy input at the heating stage. Similarly, if the contact heating element involves a force during laminating, drag is increased, leading to decreased mechanical efficiency in that a larger motor is required to drive the packet between the heating platens. Either of these prior art alternatives leads to a series of laminator deficiencies particularly when applied to packets larger that wallet-size, such as to 8½ by 11 inch sheets of paper and the like.

SUMMARY OF THE INVENTION

In view of the deficiencies associated with the prior art laminators, I have discovered an improved compact and portable laminator which features an optimum balance between thermal contact and minimum drag and which can be readily and economically manufactured, and disassembled, repaired, and reassembled, for wallet-size as well as full page packets. Thus the present invention provides a packet-type laminating machine comprising:

(a) a pair of vertical sidewall members adapted to rest on a lower edge during assembly wherein each of the vertical sidewall members contains a plurality of recesses along the top edge to accept the following items from above during assembly and retain the items in the stated relationship to each other during operation and the packet-type laminating machine further comprising the items:

(i) a pair of horizontally flat heating platens lying one on top of the other and adapted to accept and heat a packet to be laminated;

(ii) a first pair of vertically stacked rollers positioned behind the platens such that the nip between the rollers is coplanar with and essentially adjacent to the plane of contact between the platens wherein at least one roller contains a driven gear; and (iii) a horizontally flat metal shelf on the exit side of the rollers and heating platens and essentially coplanar with the nip and plane of contact;

(b) at least one rigid member adapted to attach to the vertical sidewalls and hold them essentially parallel and vertical during assembly and operation;

(c) a motor attached to a sidewall and engaged to the gear such as to drive the roller; and (d) spring means attached to the vertically stacked rollers such as to hold the pair of rollers under compression.

The present invention further provides a packet-type laminating machine wherein the vertical sidewall members further contain recesses to accept and retain a second pair of vertically stacked rollers positioned in front of the platens such that the nip between the second pair of rollers is coplanar with and essentially adjacent to the plane of contact between the platens, and the laminating machine further comprises:

(a) a second pair of rollers adapted to drop into the recesses during assembly with at least one roller containing a driven gear;

(b) a gear means attached to the sidewall containing the motor and positioned such as to engage both gears of the rollers and move the rollers synchronously; and (c) a spring means attached to the second pair of vertically stacked rollers such as to hold the pair of rollers under compression.

The invention provides in one embodiment for the heating platens to be supported by recesses in the sidewalls at the four corners of the platens and the sidewalls between the corner recesses are notched such as to accept a leaf spring member that retains the platens when the machine is inverted and applies a gentle compressive force during lamination. It is also provided that the shelf on the exit side of the rollers is supported by recesses in the sidewall at essentially the four corners of the shelf and the sidewalls between the corner recesses are notched such as to accept a leaf spring member that retains a second essentially flat metallic member in contact with the shelf when the machine is inverted and applies a gentle compressive force during cooling of the laminated packet. Optionally a clock can be attached to one of the sidewalls and driven by the motor, or gears can be placed at both ends of the rollers and sidewalls can have a gear means and synchronous counterrotating motors attached to engage and drive the geared rollers.

It is a primary object of the present invention to provide a compact and portable laminator that is extremely inexpensive to manufacture and assemble in that is uses a minimum number of components and assembly steps with maximum interchangeability of parts. It is a further object to provide a packet-type laminator of high mechanical and thermal efficiency compatible with wallet-size packets as well as full page packets and larger. The fulfillment of these objects and the presence and fulfillment of other objects will be apparent upon complete reading of the specification and claims when taken in conjection with the attached drawing.

BRIEF DESCRIPTION OF THE DRAWING

FIG. 1 is a perspective view of an improved packet-type laminating machine of the present invention.

FIG. 2 is a perspective view of the laminating machine of FIG. 1 with the external housing removed.

FIG. 3 is a top view of the laminating machine of FIG. 2.

FIG. 7 is a rear view of the laminating machine of FIG. 2.

DESCRIPTION OF THE PREFERRED EMBODIMENTS

Figure 5:
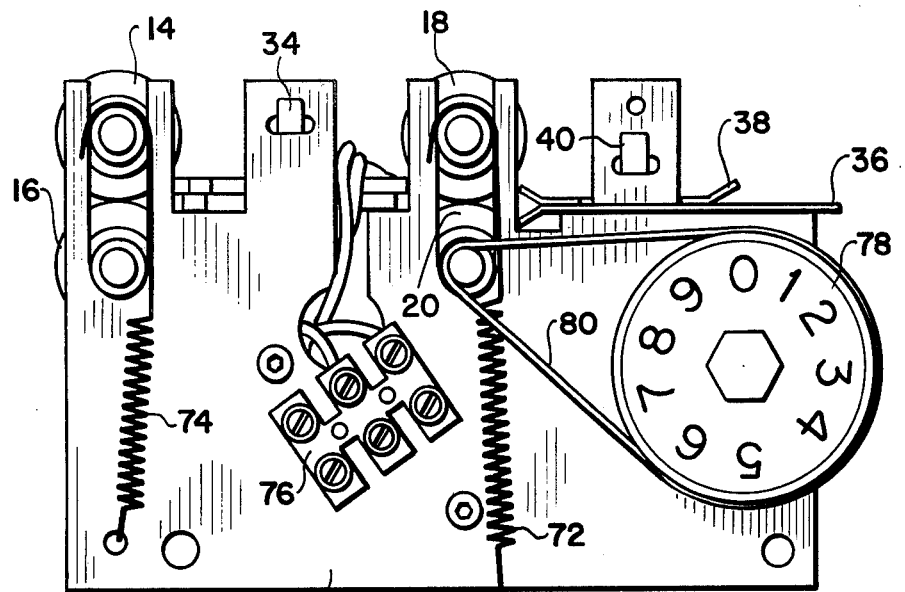
FIG. 5 is a side view of the other side of the laminating machine of FIG. 2.

The improved packet-type laminating machine according to the present invention, how it functions and how it differs from the previously known laminators can perhaps be best explained and understood by reference to the drawings. FIG. 1 illustrates a packet-type laminating machine of the present invention, generally designated by the numeral 10, as it appears in use, and as encased in a housing 12 with a pair of inlet feed rollers 14 and 16 on the front side to accept the packet with object to be laminated. FIG. 2 illustrates the same packet-type laminating machine with the housing 12 removed, thus exposing a second pair of rollers 18 and 20 with a pair of heating platens 22 and 24 positioned between the sets of stacked rollers. A motor driven gearing system 28 to synchronously drive the rollers is also exposed on the near sidewall.

From the top view of the laminating machine as illustrated in FIG. 3, the relative position of the previously mentioned components can be seen in greater detail. Positioned at the front of the laminator is the lead upper inlet roller 14 followed directly by the top platen 22 with an attached heating pad element 30 glued to the exterior top surface. A single leaf spring 34 exerts a gentle closing pressure on the center of the top platen 22 such as to assist in maintaining optimum thermal contact of the platens and the packet during lamination. Immediately adjacent to the rear of the platen 22 is the top roller 18 of the second pair of rollers which in turn is followed by the cooling shelf 36. An essentially free-floating guide element 38 is positioned on top of shelf 36 and gently held in place by a second leaf spring 40. The spring elements also serve to retain the upper platen 22 and guide surface 38 when the entire machine is inverted. The gear system 28 can also be seen in greater detail from this top view as involving a pair of driven gears 42 and 44 attached to the lower rollers 16 and 20 respectively, an intermediate gear 46 that synchronizes the motion of the rollers and a motor drive gear 48.

Figure 4:
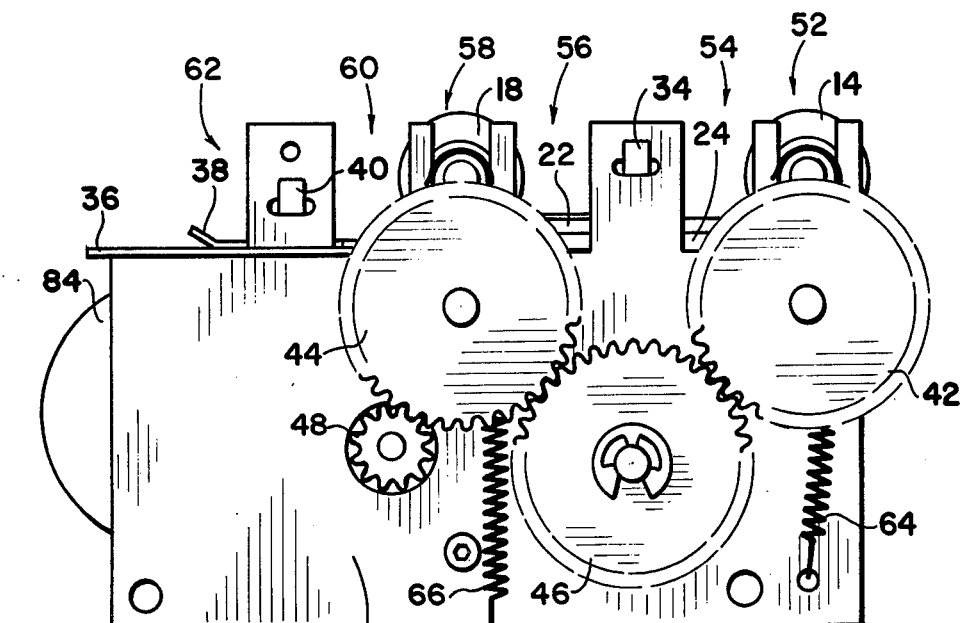
FIG. 4 is a side view of the laminating machine of FIG. 2.

FIGS. 4 and 5 illustrate side views of the laminator wherein the vertical alignment of the components and their relationships to the supporting sidewall members can be seen. In FIG. 4, sidewall 50 containing a series of recesses or notches along the top edge can be seen. Near the front of the top edge of sidewall 50 is a notch or vertical slot 52 adapted to receive and retain the pair of inlet vertically stacked rollers 14 and 16 with gear 42 attached to the lower inlet roller 16. Directly behind slot 52 is a pair of notches 54 and 56 supporting the horizontally flat heating platens 22 and 24 at their corners such that the nip of the rollers is coplanar with the contact surface between the platens. The portion of the sidewall between these notches contains a horizontal slit to accept one end of the leaf spring 34. Immediately behind the heating platens is a second vertical slot 58 adapted to receive and retain a second pair of vertically stacked rollers 18 and 20 wherein gear 44 is attached to the lower roller 20. On the outlet side of this second pair of rollers is a second set of notches 60 and 62 supporting the cooling shelf or table 36 and cooling guide element 38. Again, the portion of the sidewall between these notches contains a horizontal slit to accept one end of the second leaf spring 40. A pair of coil springs 64 and 66 loop over the axles of the top rollers of each pair or set of stacked rollers and maintain the rollers under compression.

FIG. 5 illustrates the other side of the laminator with sidewall 70 containing a series of corresponding slots or notches recessed along the top edge and supporting the components in an analogous manner. Again, a pair of compression springs 72 and 74 holds the pairs of rollers together. The electrical leads from the heating pads and thermostat attached to the platens after passing through the sidewall 70, terminate at the electrical connector 76. At the lower rear portion of sidewall 70 is an optional visual timer 78 involving a rotating disc with numbered sectors driven by an 0-ring belt 80 engaged to the axle of roller 20 and sized such as to rotate once each minute or at some other appropriate time span.

Figure 6:
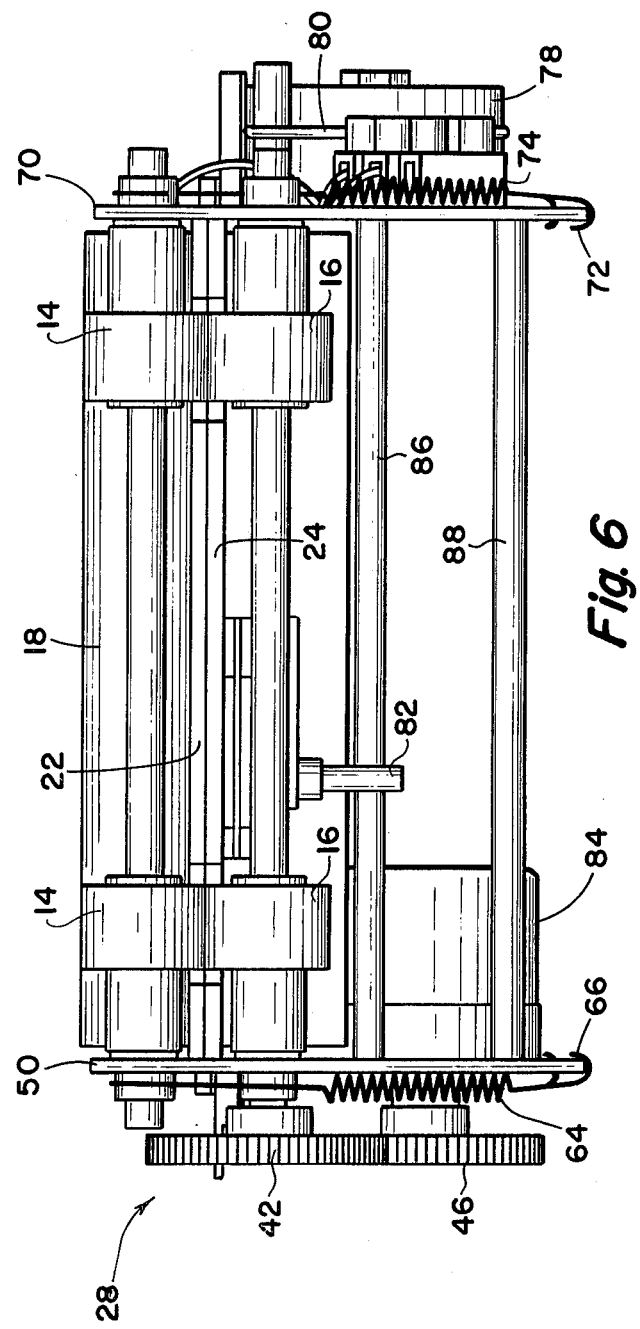
FIG. 6 is a front view of the laminating machine of FIG. 2.

From the front view of FIG. 6, is can be seen that the nip between the pair of inlet rollers 14 and 16 is essentially coplanar with the contact surface between platens 22 and 24. Preferrably the leading edges of the platens are bevelled such as to accept the laminating packet. Thermostat switch 82 is attached to the underside of lower platen 24 and is wired in series to the heating pads 30 and 32 at the electrical connector 76. To the rear of the sidewall 50 is motor 84 which drives the gear system 28. The rear view of the laminating machine as illustrated in FIG. 7 again shows the motor 84 and drive gear 48 engaged to the driven roller gear 44. The contact surface between lower cooling shelf 36 and the guide element 38 resting on the shelf 36 is aligned coplanar with the nip between the outlet rollers 18 and 20. Preferrably the leading edges of the guide element are turned up slightly to readily accept and direct the packet across the cooling shelf as it exits the laminator. Two rigid cross members 86 and 88 attach to the lower central portion of each sidewall 50 and 70 and serve to support the sidewalls in vertical parallel alignment with each other.

One of the advantages and novel features of the present invention is the ease and simplicity of assembling the laminator. Initially the motor and intermediate gear are mounted on one of the sidewall pieces and the optional timer wheel is mounted on another sidewall piece. The rigid cross members are then securely fastened to the respective sidewalls resulting in the sidewalls standing vertically parallel to each other when resting on their lower edges. The stacked pair of inlet rollers, the pair of platens with thermostat and heating pads already attached, the second pair of stacked outlet rollers, and the cooling shelf with guide element can be easily dropped into place from above. The four compression springs and two leaf springs essentially snap into place. The electric leads and terminal of the heating platens thread through the slot in the sidewall during assembly thus allowing the electrical terminal to be attached to the sidewall. The optional O-ring belt is slipped onto the timer wheel and lower outlet roller axle, essentially completing the assembly of the laminator illustrated in FIG. 2. In a similar manner the device can be readily disassembled, repaired, and reassembled at minimum cost.

An additional advantage associated with the present laminating machine is that it is readily adaptable to the extensive use of interchangeable parts, thus reducing manufacturing and repair costs. For example, all four rollers can be identical and interchangeable as can at least three of the gears; preferably a smaller silicon rubber roller sleeve (as illustrated in the drawing) is employed on the inlet rollers relative to the outlet rollers to conserve material. Both leaf springs are interchangeable as are the four coil springs. Also, both sidewalls can be identical and interchangeable with various models having differing widths. In fact, for the very wide models, two motors and drive gear systems can be employed, one on each sidewall, with synchronized counterrotating motors. These sidewall members can also be terminated or cut directly behind the inlet rollers and in front of the heating platens (see dashed line in FIG. 2) to make a two roller version of the laminator.

Still another advantage of the improved packet-type laminating machine of the present invention is that the combination of minimizing drag by gentle, evenly distributed contact of the heating platens and cooling surface with guide element, with virtually all compression occurring at the nip of the rollers, results in optimum heat and mechanical efficiency at minimum capital investment.

The specific selection of materials and choice of components to be employed can be readily made from material and parts generally available in the art. Preferably the roller surfaces are of high temperature silicon rubber and the roller axles are filled with metallic sleeve bearings as shown in the drawing. The remainder of the machine can be made of any convenient metal and preferrably involves inexpensive stamping to manufacture the respective components.

Since the assembled unit as disclosed in the drawing has its own structural integrity, the housing to encase the machine can be merely protective in nature and thus made of metal or plastic of sufficient thermal integrity to withstand the heating inherently occurring during lamination. Preferably the housing is molded of a highly thermal resistant grade of thermoplastic or fiber reinforced plastic.

Having thus described the preferred embodiments of the invention with a certain degree of particularity, it is manifest that many changes can be made in the details of the construction and the arrangement of components without departing from the spirit and scope of this disclosure. Therefore, it is to be understood that the invention is not limited to the embodiments set forth herein for purposes of exemplification, but is to be limited only by the scope of the attached claims including a full range of equivalents to which each element thereof is entitled.

I claim:

1. A packet-type laminating machine comprising:
   (a) a pair of vertical sidewall members adapted to rest on a lower edge during assembly wherein each of said vertical sidewall members contains a plurality of recesses along the top edge to accept the following items from above during assembly and retain said items in the stated relationship to each other during the operation and said packet-type laminating machine further comprising said items:
      (i) a pair of horizontally flat heating platens lying one on top of the other and adapted to accept and heat a packet to be laminated,
      (ii) a first pair of vertically stacked rollers positioned behind said platens such that the nip between said rollers is coplanar with and essentially adjacent to the plane of contact between said platens wherein at least one roller contains a driven gear, and
      (iii) a horizontally flat metal shelf on the exit side of said rollers and heating platens and essentially coplanar with said nip and plane of contact;
   (b) at least one rigid member adapted to attach to said vertical sidewalls and hold them essentially parallel and vertical during assembly and operation;
   (c) a motor attached to a sidewall and engaged to said gear such as to drive said roller; and
   (d) spring means attached to said vertically stacked rollers such as to hold said pair of rollers under compression.

2. A packet-type laminating machine of claim 1 wherein said vertical sidewall members further contain recesses to accept and retain a second pair of vertically stacked rollers positioned in front of said platens such that the nip between said second pair of rollers is coplanar with and essentially adjacent to the plane of contact between said platens, and said laminating machine further comprises:
   (a) a second pair of rollers adapted to drop into said recesses during assembly with at least one roller containing a driven gear;
   (b) a gear means attached to said sidewall containing said motor and positioned such as to engage both driven gears of said first and second pairs of rollers and move said rollers synchronously; and
   (c) a spring means attached to said second pair of vertically stacked rollers such as to hold said pair of rollers under compression.

3. A packet-type laminating machine of claim 1 or 2 wherein said heating platens are supported by recesses in said sidewalls at the four corners of said platens and the sidewalls between said corner recesses are notched such as to accept a leaf spring member that retains said platens when the machine is inverted and applies a gentle compressive force during lamination.

4. A packet-type laminating machine of claim 3 wherein said shelf on the exit side of said first pair of rollers is supported by recesses in said sidewall at essentially the four corners of said shelf and the sidewalls between said corner recesses are notched such as to accept a leaf spring member and said packet-type laminating machine further comprises said leaf spring member that retains an essentially flat metallic member in contact with said shelf when the machine is inverted and applies a gentle compressive force during cooling of the laminated packet.

5. A packet-type laminating machine of claim 4 further comprising a clock means attached to one of said sidewalls and driven by said motor.

6. A packet-type laminating machine of claim 4 wherein said geared rollers have driven gears at both ends and both sidewalls have said gear means attached to move said rollers synchronously and each sidewall has a motor engaged to said gears wherein said motors are counterrotating.

* * * * *